United States Patent Office 2,997,475
Patented Aug. 22, 1961

2,997,475
2-HYDROXY-2-LOWER ALKYL-3-LOWER ALKYL-9-10-DI(LOWER ALKOXY) - 1,2,3,4,6,7 - HEXAHYDRO-11bH-BENZO[a]QUINOLIZINES, INTERMEDIATES THEREFOR, AND PREPARATION
Arnold Brossi and Otto Schnider, Basel, Switzerland, assignors to Hoffmann-La Roche Inc., Nutley, N.J., a corporation of New Jersey
No Drawing. Filed Sept. 10, 1958, Ser. No. 760,084
Claims priority, application Switzerland Sept. 20, 1957
10 Claims. (Cl. 260—286)

This invention relates to novel chemical compounds and to novel processes for preparing the same. More particularly, the invention relates to novel basic hexahydrobenzoquinolizine tertiary carbinols and to salts thereof; and to the preparation of said basic carbinols and salts. The basic tertiary carbinols referred to can be represented by the following general formula

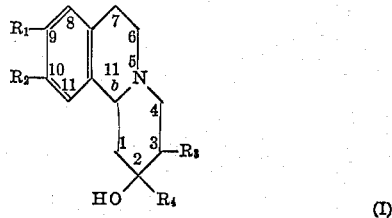

(I)

wherein each of the symbols $R^1$ and $R^2$ represents hydrogen; or lower alkoxy radicals, such as methoxy, ethoxy, n-butoxy and the like; or wherein $R^1$ and $R^2$ together represent a lower alkylenedioxy radical, e.g. methylenedioxy; the symbol $R^3$ represents lower alkyl, e.g. methyl, ethyl, n-hexyl and the like; or lower alkoxy-lower alkyl, e.g. methoxyethyl, ethoxyethyl and the like; or lower aralkyl, e.g. benzyl, β-phenylethyl and the like; and the symbol $R^4$ represents 1-lower alkinyl, e.g. ethinyl methylethinyl and the like; or 1-lower alkenyl, e.g. vinyl, 1-propenyl and the like; or lower alkyl, e.g. methyl, ethyl, isobutyl and the like; or an aryl- or an alkoxy-substitution product of each of the foregoing, e.g. n-butoxyethinyl, β-methoxyvinyl, phenylethinyl, β-phenylethyl and the like.

In a comprehensive process embodiment, the invention provides a method of making compounds having the above general Formula I which comprises condensing a compound represented by the general formula

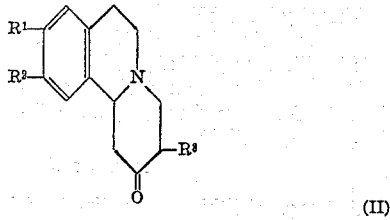

(II)

with a compound represented by the general formula $$M—C≡C—R^5 \qquad (III)$$

and hydrolyzing the intermediate condensation product obtained, thereby forming a compound having the formula

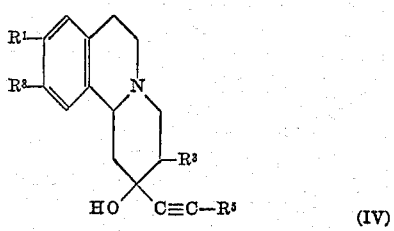

(IV)

and catalytically hydrogenating the Compound IV obtained; thereby producing a compound having the general formula

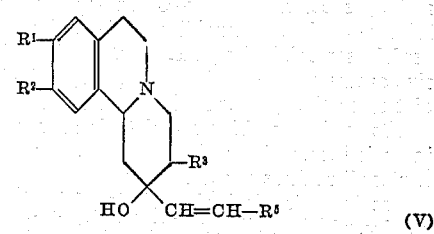

(V)

If desired, Compound IV can be more fully hydrogenated—or, alternatively, Compound V can be further catalytically hydrogenated—so as to produce a compound having the general formula

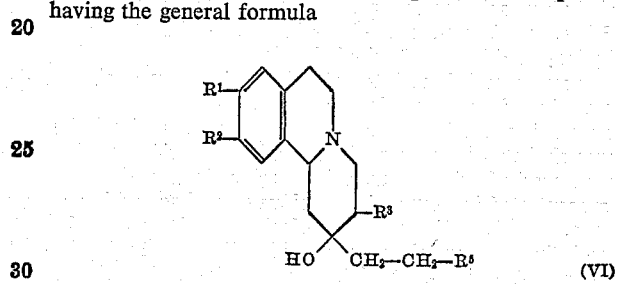

(VI)

In each of the foregoing formulas II to VI, inclusive, the symbols $R^1$, $R^2$ and $R^3$ have the same significance previously defined in connection with Formula I; the symbol M signifies alkali metal, such as lithium, or —Mg—halide, such as Mg—Br; and the symbol $R^5$ signifies hydrogen; or lower alkyl, such as methyl, ethyl, isobutyl and the like; or lower alkoxy, such as methoxy, ethoxy, n-butoxy and the like; or monocyclic hydrocarbon aryl, such as phenyl, tolyl and the like.

It will be appreciated that the symbol $R^4$ in Formula I is inclusive of the radicals —C≡C—$R^5$, —CH=CH—$R^5$ and —$CH_2$—$CH_2$—$R^5$, shown as substituents at the 2-position in Formulas IV, V and VI, respectively.

The starting materials of Formula II above belong to a known class of compounds, cf. U.S. Patents 2,830,992 and 2,830,993. The starting materials of Formula III above likewise belong to a known class of compounds, cf. J. Chem. Soc. (London), 1956, 4765.

The condensation reaction whereby Compounds II and III are converted to the alkinyl tertiary carbinol of Formula IV is advantageously effected in a solvent. When alkali metal acetylides are employed, liquid ammonia is particularly suitable as a solvent for the same. When acetylene magnesium halides are employed, ether, tetrahydrofuran, dioxan or anisole is particularly suitable. The alkinyl tertiary carbinol can be isolated by concentration of the solvent and crystallization, for example from diisopropyl ether or di-n-butyl ether.

Conversion of the alkinyl tertiary carbinols to the alkenyl tertiary carbinols of formula V or to the alkyl tertiary carbinols of Formula VI is conveniently effected by catalytic reduction with hydrogen in a solvent, such as ethanol or ethyl acetate, in the presence of a hydrogenation catalyst, such as reduced platinum oxide, Raney nickel, palladium-carbon, or Lindlar palladium-lead selective hydrogenation catalyst.

The tertiary carbinols of Formula I above are colorless, crystalline, basic compounds. They are poorly soluble in water. However, they form water-soluble crystalline salts with the usual organic and inorganic acids.

The bases of Formula I and their acid addition salts with pharmaceutically acceptable acids, e.g. tartaric acid, citric acid, phosphoric acid, sulfuric acid, methanesulfonic acid, hydrobromic acid, hydrochloric acid and the like, are characterized pharmacologically by a strong narcosis-potentiating effect and by liberation of serotonin in the brain. In consequence, the said bases and salts have an activity spectrum similar to that of the Rauwolfia alkaloids reserpine, deserpidine and rescinnamine, and are useful as medicinal agents, more particularly as hypotensive agents and tranquillizing agents; and also as intermediates for the synthesis of other medicinal agents.

The tertiary carbinols and their salts can be obtained in various stereoisomeric forms; the present invention includes all of these stereoisomers.

The invention is further disclosed in the following examples, which are illustrative but not limitative thereof.

*Example 1*

Dry acetylene gas was introduced into a solution of 1.7 g. of lithium in 1000 cc. of liquid ammonia, until the initially blue solution became colorless. Then a solution of 35 g. of 2-oxo-3-ethyl-9,10-dimethoxy-1,2,3,4,6,7-hexahydro-11bH-benzo[a]quinolizine in 1200 cc. of absolute ether was added, and the reaction mixture was shaken overnight in an autoclave at room temperature. The ammonia was allowed to evaporate, the ethereal solution was shaken with saturated ammonium chloride solution, then washed with water, dried over sodium sulfate and concentrated in vacuo. The residue was dissolved in acetone, and alcoholic hydrogen chloride solution was added until the reaction mixture was acid to litmus. 38 g. of 2-hydroxy-2-ethinyl-3-ethyl-9,10-dimethoxy-1,2,3,4,6,7-hexahydro-11bH-benzo[a]quinolizine hydrochloride crystallized; after recrystallization from methanol-ether, the material melted at 257–259° C. From the aqueous solution of this hydrochloride was precipitated, by addition of soda solution, the free base, 2-hydroxy-2-ethinyl-3-ethyl-9,10-dimethoxy-1,2,3,4,6,7-hexahydro-11bH - benzo[a]quinolizine, which after being dried and recrystallized from ethyl acetate, melted at 150° C.

15.8 g. of 2-hydroxy-2-ethinyl-3-ethyl-9,10-dimethoxy-1,2,3,4,6,7-hexahydro-11bH - benzo[a]quinolizine hydrochloride was dissolved in 200 cc. of ethanol and was catalytically hydrogenated in the presence of 5 g. of 5% palladium-carbon hydrogenation catalyst. After two molar proportions of hydrogen had been taken up, the catalyst was filtered off, the filtrate was concentrated, heated with acetone, filtered and the precipitate was recrystallized from ethanol-ether. There was thus obtained 13.5 g. of 2-hydroxy-2,3-diethyl-9,10-dimethoxy-1,2,3,4,6,7 - hexahydro-11bH-benzo[a]quinolizine hydrochloride, M.P. 192–194° C. The crystalline base, 2-hydroxy-2,3-diethyl-9,10-dimethoxy-1,2,3,4,6,7-hexahydro-11bH - benzo[a]quinolizine, precipitated from an aqueous solution of the hydrochloride by soda solution, melted, after drying and recrystallization from diisopropyl ether, at 124–125° C.

*Example 2*

Dry acetylene gas was introduced into a solution of 470 mg. of lithium in 300 cc. of liquid ammonia until the solution became colorless. To the reaction mixture was then added a solution of 22 g. of 2-oxo-3-isobutyl-9,10-dimethoxy-1,2,3,4,6,7-hexahydro-11bH - benzo[a]quinolizine in 1500 cc. of absolute ether. The reaction mixture was shaken overnight in an autoclave and worked up according to the indications in Example 1. After dissolution in diisopropyl ether of the residue obtained, 16 g. of 2 - hydroxy-2-ethinyl-3-isobutyl-9,10-dimethoxy-1,2,3,4,6,-7-hexahydro-11bH-benzo[a]quinolizine, M.P. 124–125° C., crystallized spontaneously. The hydrochloride, prepared in acetone by action of alcoholic HCl, melted at 251–252° C. with blackening.

Catalytic hydrogenation of 2-hydroxy-2-ethinyl-3-isobutyl-9,10-dimethoxy-1,2,3,4,6,7-hexahydro-11bH - benzo-[a]quinolizine hydrochloride according to the indications in Example 1 yielded 2-hydroxy-2-ethyl-3-isobutyl-9,10-dimethoxy-1,2,3,4,6,7-hexahydro-11bH - benzo[a]quinolizine hydrochloride, M.P. 216–218° C. The free base, precipitated from an aqueous solution of the hydrochloride by soda solution, melted, after drying and recrystallization from diisopropyl ether, at 121–122° C.

*Example 3*

6.8 g. of 2-hydroxy-2-ethinyl-3-isobutyl-9,10-dimethoxy-1,2,3,4,6,7-hexahydro-11bH-benzo[a]quinolizine, obtained according to the indications in Example 2, was dissolved in 100 cc. of methanol and hydrogenated over 2 g. of 5% palladium-carbon catalyst until one molar proportion of hydrogen was taken up. In 35 minutes, 490 cc. of hydrogen was taken up. After filtering off the catalyst and concentrating the filtrate, the hydrogenation product was crystallized from diisopropyl ether. There was thus obtained 5.1 g. of 2-hydroxy-2-vinyl-3-isobutyl-9,10-dimethoxy-1,2,3,4,6,7-hexahydro-11bH - benzo[a]quinolizine of M.P. 86° C. The hydrochloride, prepared in acetone by the action of alcoholic HCl, melted at 244–245° C.

Further catalytic hydrogenation of 2-hydroxy-2-vinyl-3-isobutyl-9,10-dimethoxy - 1,2,3,4,6,7 - hexahydro - 11bH - benzo[a]quinolizine, with reaction of an additional molar proportion of hydrogen, resulted in the formation of 2-hydroxy-2-ethyl-3-isobutyl - 9,10 - dimethoxy - 1,2,3,4,6,7-hexahydro-11bH-benzo[a]quinolizine.

*Example 4*

Dry acetylene gas was introduced into a solution of 1.6 g. of sodium in 250 cc. of liquid ammonia until the solution became colorless. Then a solution of 11 g. of 2-oxo-3-isobutyl-9,10-dimethoxy-1,2,3,4,6,7 - hexahydro - 11bH-benzo[a]quinolizine in 750 cc. of absolute ether was added and the mixture was stirred for two hours. The ammonia was allowed to evaporate overnight while stirring the reaction mixture continuously. The residue was mixed with saturated aqueous ammonium chloride solution, the ethereal layer was separated, washed with water, dried over sodium sulfate and concentrated. The residue was taken up in diisopropyl ether, yielding 6.5 g. of 2-hydroxy-2-ethinyl-3-isobutyl-9,10-dimethoxy - 1,2,3,4,6,7 - hexahydro-11bH-benzo[a]quinolizine of M.P. 125° C., identical with the ethinyl compound prepared in Example 2. Paper chromatography indicated the presence of an isomeric compound in the mother liquor.

Reaction of 2-oxo-3-isobutyl-9,10-dimethoxy-1,2,3,4, 6,7-hexahydro-11bH-benzo[a]quinolizine with acetylene monomagnesium bromide [J. Chem. Soc. (London), 1956, 4765], likewise yielded a mixture of two isomeric carbinols responding to the designation 2-hydroxy-2-ethinyl-3-isobutyl-9,10-dimethoxy - 1,2,3,4,6,7 - hexahydro - 11bH - benzo[a]quinolizine.

*Example 5*

500 mg. of lithium was dissolved in 250 cc. of liquid ammonia and into the solution was introduced methyl acetylene, previously dried over calcium chloride, until the reaction mixture became colorless. Then 11 g. of 2-oxo - 3 - isobutyl - 9,10 - dimethoxy-1,2,3,4,6,7-hexahydro-11bH-benzo[a]quinolizine, dissolved in 700 cc. of absolute ether, was introduced. The reaction mixture was stirred for two hours and then was allowed to stand overnight, during which time the ammonia was allowed to evaporate. The mixture was worked up according to the indications in Example 4, yielding 9.5 g. of 2-hydroxy-2-(propin-1-yl)-3-isobutyl-9,10-dimethoxy-1,2,3,4,6,7-hexa - hydro-11bH-benzo[a]quinolizine, M.P. 154° C. The hydrochloride, prepared in acetone by means of alcoholic HCl, melted at 221–222° C.

3.9 g. of 2-hydroxy-2-(propin-1-yl)-3-isobutyl-9,10-dimethoxy-1,2,3,4,6,7-hexahydro-11bH-benzo[a]quinolizine in 100 cc. of methanol was hydrogenated in the presence of 200 mg. of reduced platinum oxide hydrogenation catalyst until the quantity of hydrogen calculated for two molar proportions was taken up. 2-hydroxy-2-propyl-3-isobutyl - 9,10 - dimethoxy - 1,2,3,4,6,7-hexahydro-11bH-benzo[a]quinolizine, obtained by concentration of the filtered hydrogenation mixture and crystallization of the residue from diisopropyl ether, and recrystallization from ethyl acetate, melted at 117° C. Hydrochloride, M.P. 198–200° C.

Example 6

Into a solution of 420 mg. of lithium in 250 cc. of liquid ammonia was introduced 5.88 g. of butoxyacetylene and the reaction mixture was stirred for two hours. Then, a solution of 9.5 g. of 2-oxo-3-isobutyl-9,10-dimethoxy-1,2,3,4,6,7-hexahydro-11bH - benzo[a]quinolizine in 700 cc. of absolute ether was added while stirring. The materials were reacted and worked up according to the indications in Example 4 and the reaction product extract was crystallized from petroleum ether. There was thus obtained 2.8 g. of 2-hydroxy-2-($\beta$-butoxyethinyl)-3-isobutyl-9,10 - dimethoxy - 1,2,3,4,6,7 - hexahydro-11bH-benzo[a]quinolizine of M.P. 84° C.

Catalytic hydrogenation according to the indications in Example 1 resulted in 2-hydroxy-2-($\beta$-butoxyethyl)-3-isobutyl-9,10-dimethoxy-1,2,3,4,6,7-hexahydro - 11bH-benzo[a]quinolizine, the hydrochloride of which melted at 204–205° C.

Example 7

700 mg. of lithium was dissolved in 400 cc. of liquid ammonia and then 10.2 g. of phenylacetylene was added dropwise, while stirring. After all of the phenylacetylene had been added, the reaction mixture was stirred two hours longer. Then a solution of 16 g. of 2-oxo-3-isobutyl-9,10-dimethoxy-1,2,3,4,6,7-hexahydro - 11bH-benzo[a]quinolizine in 600 cc. of absolute ether was added with stirring to complete the reaction. Ammonia was allowed to evaporate from the reaction mixture overnight, and the residual material was worked up according to the indications in Example 4. The residue obtained was dissolved in acetone and reacted with alcoholic HCl to a congo acid reaction. The product obtained was 10 g. of 2-hydroxy-2 - phenylethinyl - 3 - isobutyl-9,10-dimethoxy-1,2,3,4,6,7-hexahydro - 11bH - benzo[a]quinolizine hydrochloride, M.P. 240° C.

The same product of M.P. 240° C. was obtained by condensing 2-oxo-3-isobutyl-9,10-dimethoxy-1,2,3,4,6,7-hexahydro-11bH-benzo[a]quinolizine in tetrahydrofuran with phenylacetylene magnesium bromide [J. Chem. Soc. (London), 1956, 4765], and hydrolyzing; in addition there was obtained a stereoisomeric compound, the hydrochloride of which melted at 273° C.

Catalytic hydrogenation of 4.56 g. of 2-hydroxy-2-phenylethinyl-3-isobutyl - 9,10 - dimethoxy - 1,2,3,4,6,7,-hexahydro-11bH-benzo[a]quinolizine hydrochloride in 70 cc. of methanol in the presence of 4 g. of 5% palladium-carbon catalyst yielded, upon uptake of the two molar proportions of hydrogen, 3.5 g. of 2-hydroxy-2-($\beta$-phenylethyl)-3-isobutyl-9,10-dimethoxy - 1,2,3,4,6,7 - hexahydro-11bH-benzo[a]quinolizine hydrochloride, which after recrystallization from methanol-ether melted at 235° C.

Example 8

2-oxo-3-butyl-9,10-dimethoxy - 1,2,3,4,6,7 - hexahydro-11bH-benzo[a]quinolizine was converted to 2-hydroxy-2-ethinyl-3-butyl-9,10-dimethoxy - 1,2,3,4,6,7-hexahydro-11bH-benzo[a]quinolizine, M.P. 115° C., according to the indications in Example 1. This product, upon reaction in acetone with alcoholic HCl, yielded a hydrochloride melting at 233–234° C. with blackening.

Catalytic hydrogenation of the hydrochloride according to the indications in Example 1 resulted in 2-hydroxy-2-ethyl-3-butyl-9,10 - dimethoxy - 1,2,3,4,6,7-hexahydro-11bH-benzo[a]quinolizine hydrochloride of M.P. 214° C. The free base melted at 85° C.

Example 9

Into a solution of 160 mg. of lithium in 100 cc. of liquid ammonia was introduced dry acetylene gas until the color disappeared. A solution of 3.2 g. of 2-oxo-3-butyl-9-methoxy - 1,2,3,4,6,7 - hexahydro-11bH-benzo[a]quinolizine in 200 cc. of absolute ether was added to the reaction mixture, which was then shaken in an autoclave at room temperature overnight. The reaction mixture was thereupon worked up according to the indications in Example 4. The residue obtained (3.0 g.) was dissolved in benzene and chromatographed on a column of 30 g. of aluminum oxide (activity grade II, neutral). Crystalline starting material was washed out with benzene. By elution with ether, there was obtained a total of 600 mg. of 2-hydroxy-2-ethinyl-3-butyl-9-methoxy-1,2,3,4,6,7-hexahydro-11bH-benzo[a]quinolizine, which after recrystallization from ethyl acetate-petroleum ether, melted at 144° C.

200 mg. of 2-hydroxy-2-ethinyl-3-butyl - 9 - methoxy-1,2,3,4,6,7-hexahydro-11bH - benzo[a]quinolizine, upon catalytic hydrogenation over 200 mg. of 5% palladium-carbon catalyst and uptake of two molar proportions of hydrogen, yielded 160 mg. of 2-hydroxy-2-ethyl-3-butyl-9-methoxy-1,2,3,4,6,7-hexahydro-11bH - benzo[a]quinolizine, which after recrystallization from diisopropyl ether melted at 131° C.

Example 10

Dry acetylene gas was introduced into a solution of 130 mg. of lithium in 100 cc. of liquid ammonia until disappearance of the color. Then a solution of 3 g. of 2-oxo-3-$\omega$-methoxybutyl - 9,10 - dimethoxy - 1,2,3,4,6,7,-hexahydro-11bH-benzo[a]quinolizine in 250 cc. of absolute ether was added. The reaction mixture was worked up according to the indications in Example 4, yielding 3.0 g. of a reaction product extract, which after being taken up in ether yielded 1.1 g. of crystalline 2-hydroxy-2-ethinyl-3-$\omega$-methoxybutyl - 9,10 - dimethoxy-1,2,3,4,6,7-hexahydro-11bH-benzo[a]quinolizine. The compound, after crystallization from ethyl acetate, melted at 109° C. The hydrochloride, prepared in acetone with alcoholic HCl, melted at 223° C.

Catalytic hydrogenation of 500 mg. of 2-hydroxy-2-ethinyl-3-$\omega$-methoxybutyl - 9,10 - dimethoxy - 1,2,3,4,6,7-hexahydro-11bH-benzo[a]quinolizine in methanol over 250 mg. of 5% palladium-carbon catalyst, with uptake of two molar proportions of hydrogen, yielded 350 mg. of 2-hydroxy-2-ethyl-3-$\omega$-methoxybutyl - 9,10-dimethoxy-1,2,3,4,6,7-hexahydro-11bH-benzo[a]quinolizine, which melted at 98° C., after recrystallization from diisopropyl ether.

We claim:

1. A compound selected from the group consisting of bases represented by the formula

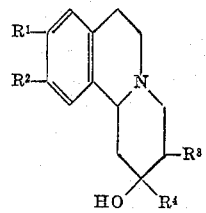

wherein $R^1$ and $R^2$ are selected from the group consisting of hydrogen, lower alkoxy, and methylenedioxy represented by $R^1$ and $R^2$ taken together; $R^3$ is selected from the group consisting of lower alkyl, lower alkenyl, phenyl-lower alkyl and lower alkoxy-lower alkyl; and $R^4$ is selected from the group consisting of lower alkyl, 1-lower alkinyl, 1-lower alkenyl, lower alkoxy-lower alkyl, lower alkoxy-1-lower alkinyl, lower alkoxy-1-lower alkenyl, phenyl-lower alkyl, phenyl-1-lower alkinyl and phenyl-1-lower alkenyl; and acid addition salts of said bases with pharmaceutically acceptable acids.

2. A process of making compounds of the formula

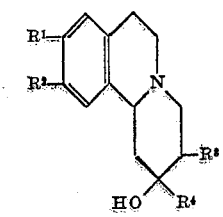

wherein $R^1$ and $R^2$ are selected from the group consisting of hydrogen, lower alkoxy, and methylenedioxy represented by $R^1$ and $R^2$ taken together; $R^3$ is selected from the group consisting of lower alkyl, lower alkenyl, phenyl-lower alkyl and lower alkoxy-lower alkyl; and $R^4$ is selected from the group consisting of lower alkyl, 1-lower alkinyl, 1-lower alkenyl, lower alkoxy-lower alkyl, lower alkoxy-1-lower alkinyl, lower alkoxy-1-lower alkenyl, phenyl-lower alkyl, phenyl-1-lower alkinyl and phenyl-1-lower alkenyl which comprises condensing a compound represented by the formula

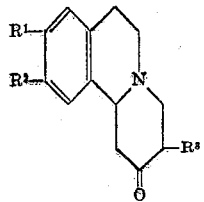

wherein each of $R^1$, $R^2$ and $R^3$ has the same meaning as defined above with a compound represented by the formula

$$M-C\equiv C-R^5$$

wherein $R^5$ is selected from the group consisting of hydrogen, lower alkyl, lower alkoxy, and phenyl and M is selected from the group consisting of alkali metal and —Mg—halide, and hydrolyzing the intermediate condensation product obtained, thereby forming a compound having the formula

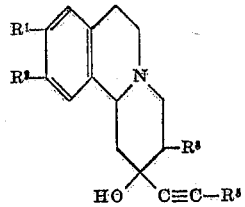

wherein each of $R^1$, $R^2$, $R^3$ and $R^5$ has the same meaning as defined above; and catalytically hydrogenating the latter compound to obtain compounds of the formula

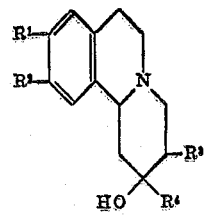

wherein each of $R^1$, $R^2$ and $R^3$ has the same meaning as defined above and wherein $R^4$ is selected from the group consisting of lower alkyl, 1-lower alkenyl, lower alkoxy-lower alkyl, lower alkoxy-1-lower alkenyl, phenyl-lower alkyl and phenyl-1-lower alkenyl.

3. 2-hydroxy-2-(lower alkin-1-yl)-3-lower alkyl-9,10-di(lower alkoxy)-1,2,3,4,6,7 - hexahydro - 11bH-benzo[a]quinolizine.

4. 2-hydroxy-2-(lower alken-1-yl)-3-lower alkyl-9,10-di(lower alkoxy) - 1,2,3,4,6,7 - hexahydro-11bH-benzo[a]quinolizine.

5. 2-hydroxy-2-lower alkyl-3-lower alkyl-9,10-di(lower alkoxy) - 1,2,3,4,6,7 - hexahydro - 11bH - benzo[a]quinolizine.

6. A salt of a compound according to claim 5 with a pharmaceutically acceptable acid.

7. 2-hydroxy-2-ethyl-3-isobutyl-9,10-dimethoxy - 1,2,3,4,6,7-hexahydro-11bH-benzo[a]quinolizine.

8. A salt of a compound according to claim 7 with a pharmaceutically acceptable acid.

9. 2 - hydroxy-2-ethyl-3-n-butyl-9,10 - dimethoxy-1,2,3,4,6,7-hexahydro-11bH-benzo[a]quinolizine.

10. A salt of a compound according to claim 9 with a pharmaceutically acceptable acid.

References Cited in the file of this patent

UNITED STATES PATENTS 2,843,591    Brossi et al. _____ July 15, 1958

FOREIGN PATENTS 789,789    Great Britain _____ Jan. 29, 1958